US009671862B2

(12) United States Patent
Govindarajeswaran et al.

(10) Patent No.: US 9,671,862 B2
(45) Date of Patent: Jun. 6, 2017

(54) SYSTEM AND METHOD FOR RECOMMENDING CONTENT TO A USER BASED ON USER'S INTEREST

(71) Applicant: Wipro Limited, Bangalore (IN)

(72) Inventors: Maheshwaran Govindarajeswaran, Chennai (IN); Arun Jeyaprasad Arjun Jeyarani, Chennai (IN)

(73) Assignee: Wipro Limited, Bangalore (IN)

( * ) Notice: Subject to any disclaimer, the term of this patent is extended or adjusted under 35 U.S.C. 154(b) by 261 days.

(21) Appl. No.: 14/559,201

(22) Filed: Dec. 3, 2014

(65) Prior Publication Data

US 2016/0109941 A1 Apr. 21, 2016

(30) Foreign Application Priority Data

Oct. 15, 2014 (IN) ............................ 5341/CHE/2014

(51) Int. Cl.
*G06F 3/01* (2006.01)
*G06F 3/03* (2006.01)
*G06K 9/00* (2006.01)
*G06F 17/30* (2006.01)

(52) U.S. Cl.
CPC ............. *G06F 3/012* (2013.01); *G06F 3/013* (2013.01); *G06F 3/0304* (2013.01); *G06F 17/30274* (2013.01); *G06K 9/00315* (2013.01); *G06F 2203/011* (2013.01)

(58) Field of Classification Search
CPC ........... G06F 17/30867; G06F 17/3053; G06F 3/013; G06F 17/30032; G06F 2203/011; H04N 21/44218; H04N 21/4668
See application file for complete search history.

(56) References Cited

U.S. PATENT DOCUMENTS

| 8,401,248 | B1* | 3/2013 | Moon | G06Q 30/0242 382/103 |
| 2007/0078971 | A1* | 4/2007 | Zellner | G06Q 10/10 709/224 |
| 2008/0202320 | A1* | 8/2008 | Skowronek | G06F 17/30743 84/609 |
| 2010/0094866 | A1* | 4/2010 | Cuttner | G06F 17/30035 707/723 |
| 2012/0124456 | A1* | 5/2012 | Perez | G06Q 30/02 715/200 |
| 2012/0130819 | A1* | 5/2012 | Willcock | G06F 17/30867 705/14.66 |

(Continued)

*Primary Examiner* — Ryan Pitaro

(74) *Attorney, Agent, or Firm* — LeClairRyan, a Professional Corporation

(57) ABSTRACT

Systems and methods for recommending content to a user based on the user's interests are described herein. In one example, the method comprises receiving at least one image of the user, and analyzing the at least one image to determine one or more facial attributes of the user. The method further comprises processing the at least one image to determine the gaze parameters of the user, determining based on the gaze parameters, an object of interest of the user and retrieving the characteristics of the object of interest. The method further comprises ascertaining, based on the facial attributes, an emotional index associated with the user, and generating recommendations of the content for the user based in part on the emotional index and characteristics of the object of interest.

12 Claims, 4 Drawing Sheets

(56) References Cited

U.S. PATENT DOCUMENTS

| | | | |
|---|---|---|---|
| 2012/0291056 A1* | 11/2012 | Donoghue | H04N 21/26258 725/5 |
| 2012/0324491 A1* | 12/2012 | Bathiche | H04H 60/33 725/10 |
| 2013/0283303 A1* | 10/2013 | Moon | G06Q 10/00 725/10 |
| 2013/0332839 A1* | 12/2013 | Frazier | H04N 21/4532 715/738 |
| 2014/0026156 A1* | 1/2014 | Deephanphongs | H04N 21/25866 725/12 |
| 2014/0089958 A1* | 3/2014 | Nichols | H04N 21/251 725/19 |
| 2014/0277649 A1* | 9/2014 | Chong | G06F 17/30752 700/94 |
| 2015/0186780 A1* | 7/2015 | Zhang | G06F 17/30752 706/12 |
| 2015/0281783 A1* | 10/2015 | Laksono | H04N 21/44222 725/10 |
| 2015/0381885 A1* | 12/2015 | Kim | H04N 5/23219 348/207.1 |
| 2016/0055378 A1* | 2/2016 | Anderson | G06K 9/00671 345/589 |
| 2016/0142767 A1* | 5/2016 | Shigeta | H04N 21/4223 725/12 |

* cited by examiner

SYSTEM AND METHOD FOR RECOMMENDING CONTENT TO A USER BASED ON USER'S INTEREST

This application claims the benefit of Indian Patent Application No. 5341/CHE/2014 filed Oct. 15, 2014, which is hereby incorporated by reference in its entirety.

TECHNICAL FIELD

The present subject matter is related, in general to data processing and, in particular, but not exclusively to a method and system for recommending content to a user based on the user's interests.

BACKGROUND

Most content recommendation systems may be classified as data filtering systems which predict an "interest" that a user would have in content, such as articles, news, music, books, movies, and videos. These content recommendation systems usually attempt to model the characteristics of the user and/or the content related thereto and the user's behaviors post consumption of the content. Most content recommendation systems usually generate recommendations of content in one of two ways: a) collaborative filtering, and b) content-based filtering. In collaborative filtering, the content recommendation systems attempts to generate a model from a user's past behaviors, as well as decisions made by other users having similar characteristics, and use that model to predict other content that the user may be interested in. In content-based filtering approaches, the content recommendation systems utilize a series of discrete characteristics of known content, which the user has consumed, in order to recommend additional content with similar properties.

The prediction accuracy of the traditional recommendation systems is highly dependent on the volume of user's past behavioral data that the recommendation system has access to. For example, in order to predict the type or genre of content that a user would be interested in, the content recommendation systems monitor and collect as much of the user's past activities and related content as possible. However, if the user is new to a recommendation system, it would be very difficult for the recommendation system to obtain enough past behavioral data of the new user in order to make any meaningful recommendation. Furthermore, most content recommendation systems usually only acquire past behavioral data voluntarily provided by users, for example through questionnaires and surveys, or behavioral data recorded by the content recommendation systems when users are directly interacting with the content recommendation systems, for example cookies or activity logs associated with the user. As a result, inactive users of the recommendation systems cannot be used to provide data for building recommendation models. Thus, for new users or inactive users, the traditional content recommendation systems become less effective in personalized content recommendation.

SUMMARY

Disclosed herein are systems and methods for recommending content to a user based on the user's interests. In one example, the system, for recommending content to a user based on the user's interests, comprises a processor, a memory communicatively coupled to the processor, wherein the memory stores processor-executable instructions, which, on execution, cause the processor to receive at least one image of the user, analyze the at least one image to determine one or more facial attributes of the user, and process the at least one image to determine the gaze parameters of the user. The instructions, on execution, further cause the processor to determine, based on the gaze parameters, an object of interest of the user and retrieve the characteristics of the object of interest. Thereafter, the instructions, on execution, further cause the processor to ascertain, based on the facial attributes, an emotional index associated with the user, and generate recommendations of the content for the user based in part on the emotional index and characteristics of the object of interest.

In an aspect of the present subject matter, the method for recommending content to a user based on the user's interests comprises receiving at least one image of the user, and analyzing the at least one image to determine one or more facial attributes of the user. The method further comprises processing the at least one image to determine the gaze parameters of the user, determining based on the gaze parameters, an object of interest of the user and retrieving the characteristics of the object of interest. The method further comprises ascertaining, based on the facial attributes, an emotional index associated with the user, and generating recommendations of the content for the user based in part on the emotional index and characteristics of the object of interest.

It is to be understood that both the foregoing general description and the following detailed description are exemplary and explanatory only and are not restrictive of the present subject matter, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
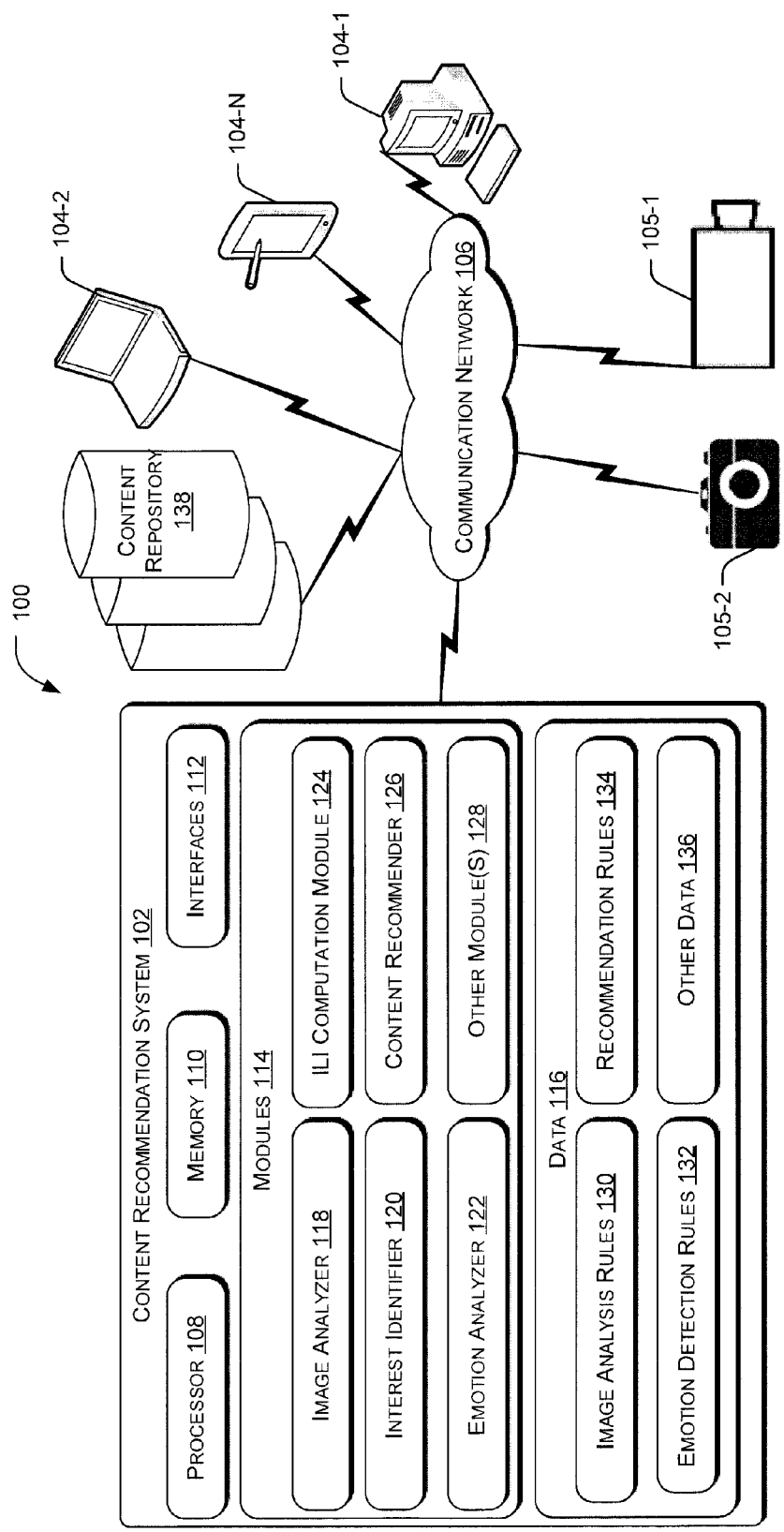
FIG. 1 illustrates a network environment implementing a content recommendation system for recommending content to a user, based on the user's interests, in a communication network environment, according to some embodiments of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for recommending content to a user based on the user's interests are described herein. The systems and methods may be implemented in a variety of computing systems. The computing systems that can implement the described method(s) include, but are not limited to a server, a desktop personal computer, a notebook or a portable computer, a mainframe computer, and in a mobile computing environment. Although the description herein is with reference to certain computing systems, the systems and methods may be implemented in other computing systems, albeit with a few variations, as will be understood by a person skilled in the art.

With the development of technology, there has been an exponential increase in the number of users who consume content using client devices, such as smart televisions, computers, laptops, smartphones and so on. Some of these client devices are interactive and allow the users to interact with the distributors of the content. This increased interaction facilitates the distributors to provide more personalized content to the users.

Most distributors generally use a content recommendation engine. The content recommendation engine recommends new content to the user based on information known about a user. Generally, as the volume of information that a recommendation engine has concerning a specific user increases, the accuracy of recommend content that the user will find interesting also increases. As a result, gathering information concerning the types of content that a user finds interesting and not find interesting is significant for providing a good user experience.

In certain cases, the distributors facilitate the users to indicate their interest in a content provided by the distributors by selecting a level of interest or otherwise rating the content. In many cases, the content recommendation engines are integrated within the client devices and the content recommendation engines facilitate the user to indicate whether they found a particular content interesting or not.

The present subject matter discloses systems and methods for recommending content to a user, based on the user's interests, in a communication network environment. In one implementation, the content recommendation system may be implemented as a laptop computer, a desktop computer, a notebook, a workstation, a media player, a smartphone, an electronic book reader, a gaming device, a tablet and the like. In some implementations, the content recommendation system may be connected to various client devices either directly or over a network. In other implementations, the content recommendation system may be integrated within the client devices. For the sake of ease and brevity of explanation, herein it is assumed that the content recommendation system is integrated within the client device.

In some examples, the content recommendation system may have a camera integrated with the content recommendation system. In other cases, the content recommendation system may be connected to an external camera, such as a web camera, through one of the ports, such as the universal serial bus (USB) port, of the content recommendation system. In operation, the content recommendation system captures one or more images of the user using the integrated or the external camera. In some examples, the camera may use commercially available focusing techniques and facial recognition techniques to capture the image of the user, especially the user's face. In some implementations, the camera may zoom in or out to capture the face of the user, such that various facial attributes of the user may be captured.

Thereafter, the content recommendation system may filter certain images from amongst the captured images. For example, pictures which are blurry or do not have a minimum illumination level or sharpness level may be rejected by the content recommendation system. In some examples, the content recommendation system then processes one or more of the filtered images. In one example, the content recommendation system may perform processing to enhance one or more image parameters, such as hue, color, saturation, contrast, exposure and luminosity, of the image. The processed images are then analyzed by the content recommendation system to identify gaze parameters of gaze of the user.

In one example, the content recommendation system may analyze the eye movements of the user to determine the gaze parameters, such as gaze direction and gaze duration. The content recommendation system correlates the gaze parameters to the scene being displayed on the screen of the content recommendation system. The scene may be understood to include a portion of a webpage or an article which is being displayed on the screen or a frame of a video which is being played by the content recommendation system. In some examples, the content recommendation system may correlate the gaze parameters with the object of interest. For example, a high duration of gaze does not necessarily translate into a higher level of interest. The high gaze duration may be due to the complexity of the object of interest or the item being displayed. In some examples, the content recommendation system may take into account the characteristics of the items present in a scene and associate a reference gaze duration with each of the items. A user's gaze duration may be considered to be an interest only of the user's gaze duration exceeds the reference value.

Based on the gaze parameters, the content recommendation system determines the item (for example, person, place, or thing) at which the user was directly looking at. The item at which the user was looking at is henceforth referred to as object of interest. In some examples, it is possible that there are multiple objects of interest on a single scene. For example, if the user was watching a cricket match in which the batsman was being run-out by the wicket keeper both the batsman and the wicketkeeper may qualify as the object of interest. In some examples, the content recommendation system may follow the movement of the user's eyes so as to determine the items which the user is following and designate those items as objects of interest. In case the user is using glasses to view 3-dimensional content, the cameras may be placed within the corner of glasses to facilitate the tacking of eye movement of the user by the content recommendation system.

In a parallel or sequential operation, the content recommendation system also analyzes the processed image to determine facial attributes of the user. In one example, the content recommendation system may use various commercially available facial recognition techniques, such as principal component analysis using eigen-faces, linear discriminate analysis, elastic bunch graph matching using the fisherface algorithm, the hidden markov model, the multi-linear subspace learning using tensor representation, and the neuronal motivated dynamic link matching, to identify the face of the user in the processed images. Thereafter, the content recommendation system further analyzes the detected face to ascertain the facial features of the user. Examples of facial features may include tongue show, jaw thrust, jaw sideways, lip bite, cheek blow, cheek puff, cheek suck, tongue bulge, lip wipe, dimple, lip corner depression and so on. Each of these facial features may be associated with a pre-defined emotion indicator. Based on the mapping of the determined facial features with the pre-defined emotion indicators, the content recommendation system computes an emotional index of the user.

With time, as the user consumes the content, the user's emotional state will also change. For example, on seeing the user's favorite actor or actress, the user may become happy or the intensity of the user's involvement might increase on viewing a thriller movie or a scary scene. In one implementation, the content recommendation system monitors the emotional index of the user at regular or pre-defined interval to detect emotional transitions of the user while consuming a content. In one example, the content recommendation system detects emotional transition of the user based on the changes in emotional index.

Thereafter, the content recommendation system suggests or recommends other content based on characteristics associated with the object of interest, emotional transitions, and the user's interest level. For example, if the user enjoys scenes of actor X, the content recommendation system recommends content which includes actor X.

In certain cases, it is possible that the user's eyes was following the object of interest not because of the user's interest in the object of interest but because of the user's interest in the action in which the object of interest was involved in the content. It is possible that the user is interested in such actions irrespective of the presence or absence of the object of interest, or the user in user is interested in such actions only when the object of interest is involved in such actions or the user may be interested in the object of interest irrespective of the action in which the object of interest is involved.

In such cases, the content recommendation system may, after identification of the object of interest based on the gaze parameters, further determine the action in which the object of interest is involved in. The content recommendation system thereafter classifies the action into one or more genres. Genre may be understood to be a particular type or category of content. It is possible that a content may belong to more than one genre. For example, if the content is a movie, then the content may be classified into genres, such as action, adventure, comedy, crime, fantasy, horror, mystery, and political. However, the movie may include songs, and those portions of the song may be classified into various music genres, such as classical, rock, pop, electronic, heavy metal and trance.

However, if the content is a video of a game or a match, portions of the content may be tagged with the highlight of the particular scene. For example, in a game of soccer, the portions of the content may be tagged with the highlight points of soccer game in general, such as a goal scored, a penalty kick awarded, a penalty kick scored, a goal saved, a corner kick, a player being awarded red card, a self-goal, and so on. Similarly for the game of cricket, the portions of the content may be tagged with the highlight action of the scene, such as a batsman was bowled, a boundary was hit, a sixer was hit, a cover drive was hit, a no-ball was bowed, a batsman was dismissed, a catch was dropped and so on.

Thus, in some cases, the content recommendation system may classify the action into various levels of genres. Meanwhile, as described earlier, the content recommendation system also detects emotional transitions of the user, based on changes in an emotional index associated with the user.

The content recommendation system then compares the detected emotional transition of the user is compared with at least one of a historic emotional transition and a subsequent emotional transition associated with the user on viewing at least one of the object of interest and the one or more genres of the action. This helps the content recommendation system to ascertain whether the user's emotional transition was caused due to the action only or the object of interest only or the object of interest's involvement in the action. In some examples, based on the comparison, the content recommendation system determines whether the user is interested in at least one of the object of interest and the one or more genres of the action. Thereafter, the content recommendation system generates content recommendations, for the user, based on characteristics associated with the object of interest, the one or more genres of the action, emotional transitions, and the user's interest level.

Thus, the content recommendation system recommends content based on at least one of the object of interest of the user and an action in which the object of interest is involved in. The working of the systems and methods for recommending content to a user based on the user's interests is described in greater detail in conjunction with FIGS. 1-4. It should be note that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a network environment 100 implementing a content recommendation system 102 for recommending content to a user based on the user's interests, according to some embodiments of the present subject matter. In one implementation, the content recommendation system 102 may be included within an existing information technology infrastructure of an organization. For example, the content recommendation system 102 may be interfaced with the existing data warehouses, data marts, data repositories, database and file management system(s), of the organization.

The content recommendation system 102 may be implemented in a variety of computing systems, such as a laptop computer, a desktop computer, a notebook, a workstation, a mainframe computer, a server, a network server, a media player, a smartphone, an electronic book reader, a gaming device, a tablet and the like. It will be understood that the content recommendation system 102 may be accessed by users through one or more client devices 104-1, 104-2, 104-3, 104-N, collectively referred to as client devices 104.

Examples of the client devices 104 include, but are not limited to, a desktop computer, a portable computer, a mobile phone, a handheld device, a workstation. The client devices 104 may be used by various stakeholders or end users of the organization, such as project managers, database administrators and heads of business units and departments of the organization. As shown in the figure, such client devices 104 are communicatively coupled to the content recommendation system 102 through a network 106 for facilitating one or more end users to access and/or operate the content recommendation system 102. In some examples, the content recommendation system 102 may be integrated with the client devices 104.

In some examples, the content recommendation system 102 and/or the client devices 104 may be communicatively coupled to sensors 105-1 and 105-2. The sensors 105 may be understood to be any image capturing device, such as a digital camera and a video camera, which captures the images of the user at a default sampling frequency. In one example, the sensor 105 may be directly communicatively coupled to the content recommendation system 102 and/or the client devices 104. In another example, as shown in the figure, the sensors 105 may be communicatively coupled to the content recommendation system 102 and/or the client devices 104 through a network 106 for facilitating the capturing of images of the user. In one example, the sensor 105 may be integrated within the content recommendation system 102 and/or the client devices 104, for example as an in-built camera.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

In one implementation, the content recommendation system 102 includes a processor 108, a memory 110 coupled to the processor 108 and interfaces 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the content recommendation system 102 to interact with the client devices 104. Further, the interface(s) 112 may enable the content recommendation system 102 respectively to communicate with other computing devices. The interface(s) 112 can facilitate multiple communications within a wide variety of networks and protocol types, including wired networks, for example LAN, cable, etc., and wireless networks such as WLAN, cellular, or satellite. The interface(s) 112 may include one or more ports for connecting a number of devices to each other or to another server.

In one example, the content recommendation system 102 includes modules 114 and data 116. In one embodiment, the modules 114 and the data 116 may be stored within the memory 110. In one example, the modules 114, amongst other things, include routines, programs, objects, components, and data structures, which perform particular tasks or implement particular abstract data types. The modules 114 and 116 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the modules 114 further include an image analyzer 118, an interest identifier 120, an emotion analyzer 122, an interest level index (ILI) computation module 124, a content recommender 126, and other module(s) 128. The other modules 128 may perform various miscellaneous functionalities of the content recommendation system 102. It will be appreciated that such aforementioned modules may be represented as a single module or a combination of different modules.

In one example, the data 116 serves, amongst other things, as a repository for storing data fetched, processed, received and generated by one or more of the modules 114. In one implementation, the data 116 may include, for example, image analysis rules 130, emotion detection rules 132, recommendation rules 134, and other data 136. In one embodiment, the data 116 may be stored in the memory 110 in the form of various data structures. Additionally, the aforementioned data can be organized using data models, such as relational or hierarchical data models. The other data 136 may be used to store data, including temporary data and temporary files, generated by the modules 114 for performing the various functions of the content recommendation system 102.

In one implementation, the content recommendation system 102 is communicatively coupled with a content repository 138. The content repository 138 may comprise one or more commercially available data storage media, such as compact discs, magnetic tapes, SATA disks, and so on. The content repository 138 may also implement various commercially available database management systems, such as Oracle™ Database, and Microsoft™ SQL Server. In one example, the content repository 138 stores content, such as articles, news, music, books, movies, and videos. In one implementation, the content repository 138 may be implemented within the content recommendation system 102. In one example, the content repository 138 may be understood to include data warehouses, database management systems, data marts, and so on.

For the sake of brevity and simplicity, the working of the present subject is explained in the context in which the sensors 105 are connected over the network 106. In operation, the content recommendation system 102 captures one or more images of the user using the sensors 105. In some examples, the sensors 105 may use commercially available focusing techniques and facial recognition techniques to capture the image of the user, especially the user's face. In some implementations, the sensors 105 may zoom in or out to capture the face of the user, such that various facial attributes of the user may be captured. The sensors 105 transmit the captured images to the content recommendation system 102 over the network 106.

Thereafter, the image analyzer 118 may filter certain images, based on image analysis rules 130, from amongst the captured images for further analysis. For example, pictures which are blurry or do not have a minimum illumination level or sharpness level, as defined in the image analysis rules 130, may be rejected by the image analyzer 118. In some examples, the image analyzer 118 then processes one or more of the filtered images.

In one example, the image analyzer 118 may perform image processing to enhance one or more image parameters, such as hue, color, saturation, contrast, exposure and luminosity, of the image. The processed images are then further analyzed by the interest identifier 120 to identify gaze parameters of gaze of the user.

In some examples, the interest identifier 120 may analyze the eye movements of the user, based on images captured over a pre-determined time interval, to determine the gaze parameters, such as gaze direction and gaze duration. The interest identifier 120 correlates the gaze parameters to the scene being displayed on the screen of the client devices 104. In the context of the present subject matter, the scene may be understood to include a portion of a webpage or an article which is being displayed on the screen or a frame of a video which is being played by the user. In some examples, the interest identifier 120 may correlate the gaze parameters with the characteristics of the object of interest. For example, in some cases, a high duration of gaze does not necessarily translate into a higher level of interest. The high gaze duration may be due to the complexity of the object of interest or the item being displayed. In some examples, the interest identifier 120 may take into account the characteristics of the items present in a scene and associate a reference gaze duration with each of the items. The interest identifier 120 may consider the user's gaze duration as an interest only if the user's gaze duration exceeds the reference value.

Based on the gaze parameters, the interest identifier 120 determines the item (for example, a person, a place, a building, or a thing) at which the user was directly looking at. As mentioned earlier, the item at which the user was looking at is henceforth referred to as object of interest. In some examples, it is possible that there are multiple objects of interest on a single scene. For example, if the user was watching a cricket match in which the batsman was being run-out by the wicket keeper both the batsman and the wicketkeeper may qualify as the object of interest. In some examples, the interest identifier 120 may follow the movement of the user's eyes so as to determine the items which the user is following and designate those items as objects of interest.

In a parallel or sequential operation, the emotional analyzer 122 also analyzes the processed image to determine facial attributes of the user. In one example, the emotional analyzer 122 may use various commercially available facial recognition techniques, such as principal component analysis using eigen-faces, linear discriminate analysis, elastic bunch graph matching using the fisherface algorithm, the hidden markov model, the multi-linear subspace learning using tensor representation, and the neuronal motivated dynamic link matching, to identify the face of the user in the processed images. Thereafter, the emotional analyzer 122 further analyzes the detected face to ascertain the facial features of the user. Examples of facial features may include tongue show, jaw thrust, jaw sideways, lip bite, cheek blow, cheek puff, cheek suck, tongue bulge, lip wipe, dimple, lip corner depression and so on. Each of these facial features may be associated with a pre-defined emotion indicator. Based on the mapping of the determined facial features with the pre-defined emotion indicators, the emotional analyzer 122 computes an emotional index of the user.

With time, as the user consumes the content, the user's emotional state will also change. For example, on seeing the user's favorite actor or actress, the user may become happy or the intensity of the user's involvement might increase on viewing a thriller movie or a scary scene. In one implementation, the emotional analyzer 122 monitors the emotional index of the user at regular or pre-defined interval to detect emotional transitions of the user while consuming a content. In one example, the emotional analyzer 122 detects emotional transition of the user based on the changes in emotional index.

Thereafter, the content recommender 126 suggests or recommends other content based on characteristics associated with the object of interest, emotional transitions, and the user's interest level. For example, if the user enjoys scenes of actor X, the content recommendation system recommends content which includes actor X.

In certain cases, it is possible that the user's eyes was following the object of interest not because of the user's interest in the object of interest but because of the user's interest in the action in which the object of interest was involved in the content. It is possible that the user is interested in such actions irrespective of the presence or absence of the object of interest, or the user in user is interested in such actions only when the object of interest is involved in such actions or the user may be interested in the object of interest irrespective of the action in which the object of interest is involved.

In such cases, interest level index (ILI) computation module 124 may, after identification of the object of interest based on the gaze parameters, further determine the action in which the object of interest is involved in. The ILI computation module 124 thereafter classifies the action into one or more genres. In another example, the ILI computation module 124 may read the meta data associated with the content to determine the one or more genres in which the content may be classified. It is possible that a content may belong to more than one genre. For example, if the content is a movie, then the content may be classified into genres, such as action, adventure, comedy, crime, fantasy, horror, mystery, and political. However, the movie may include songs, and those portions of the song may be classified into various music genres, such as classical, rock, pop, electronic, heavy metal and trance. This is demonstrated in form of Table-1 below

TABLE 1

| | Time Duration | | | | | | |
|---|---|---|---|---|---|---|---|
| | 0-23 | 23-26 | 26-31 | 31-34 | 34-37 | 37-43 | 43-48 |
| Audio Genre | Film Soundtrack | Electronic | Film Soundtrack | Pop | Electronic | Film Soundtrack | Film Soundtrack |

TABLE 1-continued

| | Time Duration | | | | | | |
|---|---|---|---|---|---|---|---|
| | 0-23 | 23-26 | 26-31 | 31-34 | 34-37 | 37-43 | 43-48 |
| Video Genre | Drama | Romantic Song | Action | Tragic Song | Action | Drama | Action |
| Object of Interest | | Actor X, Actress Y, Singer Z | | Actor X, Actress Y, Singer M | | | |

However, if the content is a video of a game or a match, portions of the content may be tagged with the highlight of the particular scene. For example, in a game of soccer, the portions of the content may be tagged with the highlight points of soccer game in general, such as a goal scored, a penalty kick awarded, a penalty kick scored, a goal saved, a corner kick, a player being awarded red card, a self-goal, and so on. Similarly for the game of cricket, the portions of the content may be tagged with the highlight action of the scene, such as a batsman was bowled, a boundary was hit, a sixer was hit, a cover drive was hit, a no-ball was bowed, a batsman was dismissed, a catch was dropped and so on. This is further illustrated in Table 2 below

TABLE 2

| Duration | Metadata |
|---|---|
| 0-1 | Player A hits Player B for a Six |
| 1-2 | Player C drops catch |
| 2-3 | Player D attempts to stump Player A |
| 3-4 | Player A bowled by Player B |
| 4-5 | Player E plays a square cut and scores a boundary |
| 5-6 | Player E defends on back foot |

Thus, in some cases, the ILI computation module 124 may classify the action into various levels of genres, based on the metadata associated with the content. Meanwhile, as described earlier, the emotional analyzer 122 also detects emotional transitions of the user, based on changes in an emotional index associated with the user.

The ILI computation module 124 then compares the detected emotional transition of the user is compared with at least one of a historic emotional transition and a subsequent emotional transition associated with the user on viewing at least one of the object of interest and the one or more genres of the action. This helps the ILI computation module 124 to ascertain whether the user's emotional transition was caused due to the action only or the object of interest only or the object of interest's involvement in the action. In some examples, based on the comparison, the ILI computation module 124 determines whether the user is interested in at least one of the object of interest and the one or more genres of the action. Thereafter, the content recommender 126 generates content recommendations, for the user, based on characteristics associated with the object of interest, the one or more genres of the action, emotional transitions, and the user's interest level.

Thus, the content recommendation system 102 recommends content based on at least one of the object of interest of the user and an action in which the object of interest is involved in. The detailed working of the content recommendation system 102 is further explained in conjunction with the FIGS. 2-4.

Figure 2:
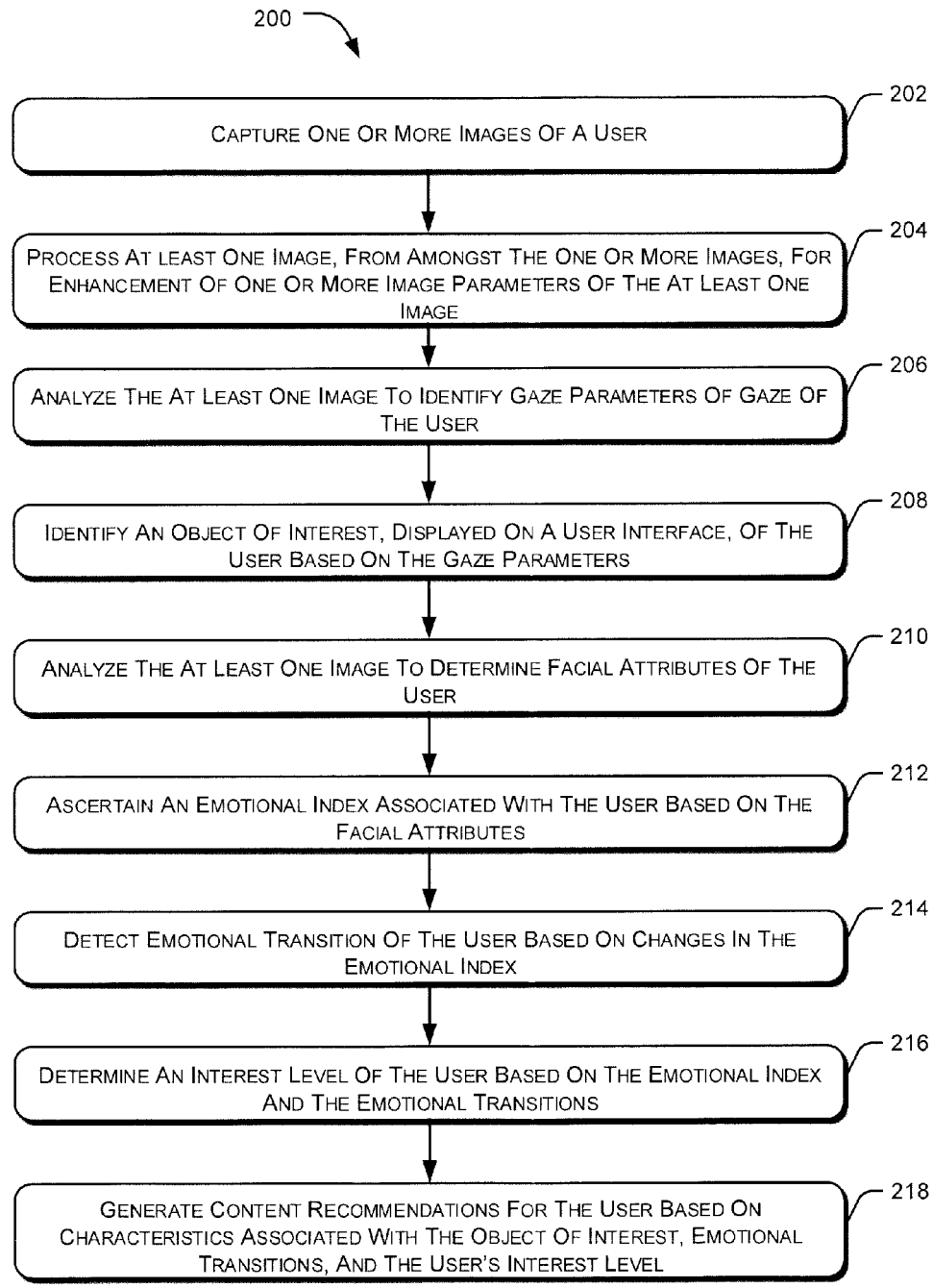
FIGS. 2 and 3 illustrate exemplary computer implemented methods for recommending content to a user, based on the user's interests, in a communication network environment, according to an embodiment of the present subject matter.
Figure 3:
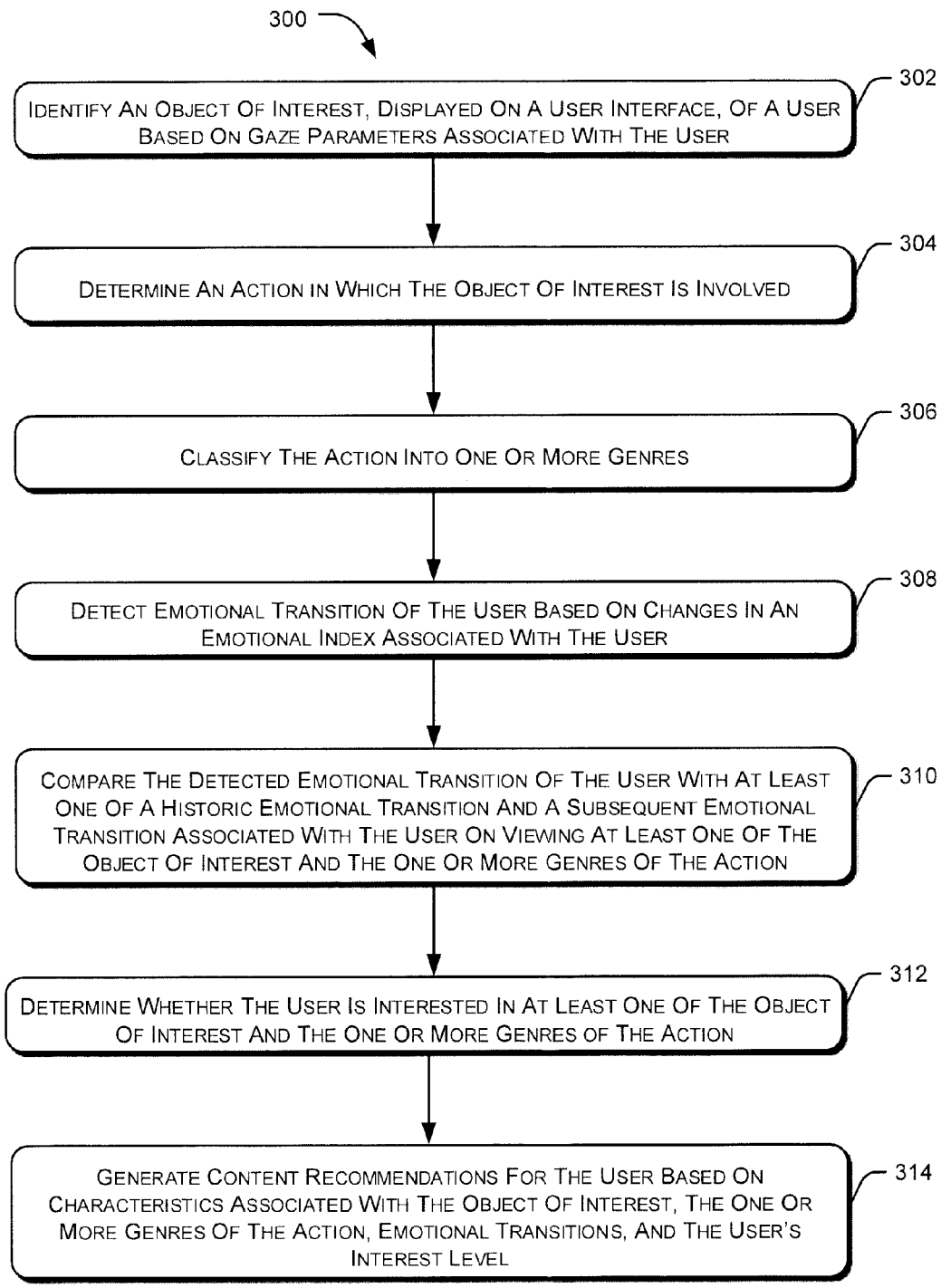

FIGS. 2 and 3 illustrate exemplary computer implemented methods 200 and 300 for recommending content to a user based on the user's interests, according to an embodiment of the present subject matter. The methods 200 and 300 may be described in the general context of computer executable instructions. Generally, computer executable instructions can include routines, programs, objects, components, data structures, procedures, modules, and functions, which perform particular functions or implement particular abstract data types. The methods 200 and 300 may also be practiced in a distributed computing environment where functions are performed by remote processing devices that are linked through a communication network. In a distributed computing environment, computer executable instructions may be located in both local and remote computer storage media, including memory storage devices.

The order in which the methods 200 and 300 are described is not intended to be construed as a limitation, and any number of the described method blocks can be combined in any order to implement the methods 200 and 300 or alternative methods. Additionally, individual blocks may be deleted from the methods 200 and 300 without departing from the spirit and scope of the subject matter described herein. Furthermore, the methods 200 and 300 can be implemented in any suitable hardware, software, firmware, or combination thereof.

With reference to method 200 as depicted in FIG. 2, as shown in block 202, one or more images of a user are captured. In some examples, the image analyzer 118 receives the images of the user captured by the sensors 105.

As depicted in block 204, at least one image, from amongst the one or more images, is processed. In some examples, the processing enhances one or more image parameters of the at least one image. In some examples, the image analyzer 118 may perform image processing to enhance one or more image parameters, such as hue, color, saturation, contrast, exposure and luminosity, of the image.

As illustrated in block 206, the at least one image is analyzed to identify gaze parameters of gaze of the user. In some examples, the interest identifier 120 may analyze the eye movements of the user, based on images captured over a pre-determined time interval, to determine the gaze parameters, such as gaze direction and gaze duration.

At block 208, an object of interest, displayed on a user interface, of the user is identified based on the gaze parameters. In some examples, the interest identifier 120 correlates the gaze parameters to the scene being displayed on the screen of the client devices 104 to identify the objects of interest.

As shown in block 210, the at least one image is analyzed to determine facial attributes of the user. In some examples, the emotional analyzer 122 also analyzes the processed image to determine facial attributes of the user As depicted in block 212, an emotional index, associated with the user, is ascertained based on the facial attributes. In some examples, the emotional analyzer 122 monitors the emotional index of the user at regular or pre-defined interval to detect emotional transitions of the user while consuming a content.

As illustrated in block 214, emotional transition of the user are detected based on changes in the emotional index. In some examples, the emotional analyzer 122 detects emotional transition of the user based on the changes in emotional index.

At block 216, an interest level of the user, is determined, based on the emotional index and the emotional transitions. In some examples, ILI computation module 124 determines an interest level of the user, for the content being consumed, based on the emotional index and the emotional transitions.

As depicted in block 218, content recommendations, for the user, is generated, based on characteristics associated with the object of interest, emotional transitions, and the user's interest level. In some examples, the content recommender 126 suggests or recommends other content based on characteristics associated with the object of interest, emotional transitions, and the user's interest level. For example, if the user enjoys scenes of actor X, the content recommendation system recommends content which includes actor X.

With reference to method 300 as depicted in FIG. 3, as shown in block 302, an object of interest, displayed on a user interface of a user is identified, based on gaze parameters associated with the user. In some examples, the interest identifier 120 correlates the gaze parameters to the scene being displayed on the screen of the client devices 104 to identify the objects of interest.

As illustrated in block 304, an action, in which the object of interest is involved, is determined. In some examples, the ILI computation module 124 may, after identification of the object of interest based on the gaze parameters, further determine the action in which the object of interest is involved in.

As depicted in block 306, the action is classified into one or more genres. In some examples, the ILI computation module 124 thereafter classifies the action into one or more genres. In another example, the ILI computation module 124 may read the metadata associated with the content to determine the one or more genres in which the content may be classified.

At block 308, an emotional transition of the user is detected, based on changes in an emotional index associated with the user. In some examples, the emotional analyzer 122 detects emotional transition of the user based on the changes in emotional index.

As depicted in block 310, the detected emotional transition of the user is compared with at least one of a historic emotional transition and a subsequent emotional transition associated with the user on viewing at least one of the object of interest and the one or more genres of the action. In some examples, the ILI computation module 124 compares the detected emotional transition of the user is compared with at least one of a historic emotional transition and a subsequent emotional transition associated with the user on viewing at least one of the object of interest and the one or more genres of the action. This helps the ILI computation module 124 to ascertain whether the user's emotional transition was caused due to the action only or the object of interest only or the object of interest's involvement in the action As illustrated in block 312, it is determined whether the user is interested in at least one of the object of interest and the one or more genres of the action. In some examples, based on the comparison, the ILI computation module 124 determines whether the user is interested in at least one of the object of interest and the one or more genres of the action.

As shown in block 314, content recommendations, for the user, are generated based on characteristics associated with the object of interest, the one or more genres of the action, emotional transitions, and the user's interest level. In some examples, the content recommender 126 generates content recommendations, for the user, based on characteristics associated with the object of interest, the one or more genres of the action, emotional transitions, and the user's interest level.

Computer System

Figure 4:
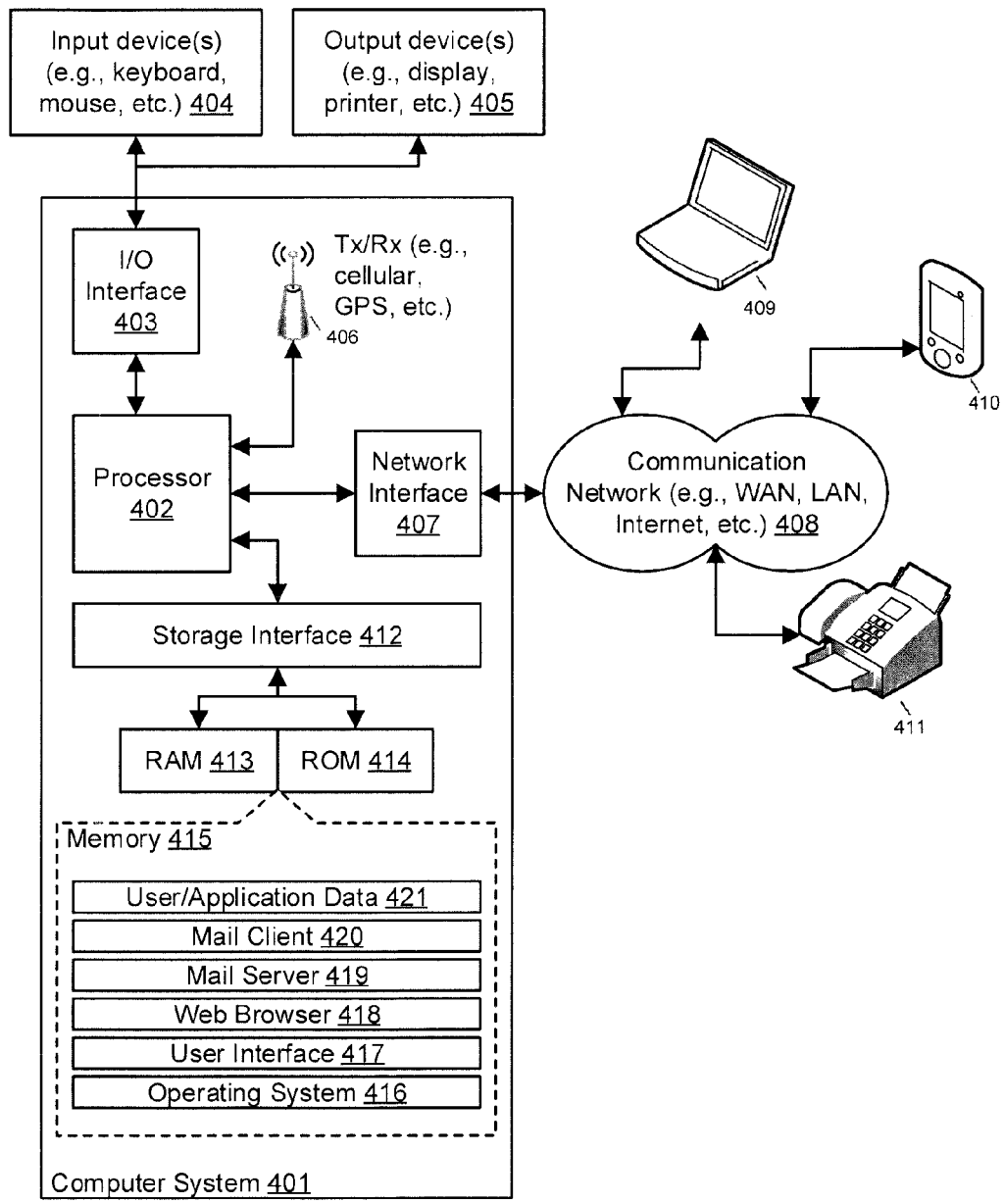
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing any of the devices presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 418-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for recommending content to a user based on the user's interests. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A content recommendation device, comprising a processor and a memory comprising programmed instructions stored thereon, the memory coupled to the processor which is configured to be capable of executing the programmed instructions to:

receive at least one image of a user;

analyze the at least one image to determine one or more facial attributes of the user and one or more gaze parameters of the user;

determine, based on the gaze parameters, an object of interest of the user;

retrieve one or more characteristics of the object of interest;

determine, based on the one or more facial attributes, an emotional index associated with the user;

generate one or more content recommendations for the user based at least in part on the emotional index and the one or more characteristics of the object of interest;

determine an action in which the object of interest is involved;

classify the determined action into one or more genres;

detect an emotional transition of the user upon the user consuming the determined action;

compare the emotional transition of the user upon the user consuming first content involving the object of interest, second content involving the object of interest involved in one or more actions associated with the one or more genres, and third content involving one or more actions associated with the one or more genres and not including the object of interest; and modify the one or more content recommendations based on the comparison.

2. The content recommendation device, as claimed in claim 1, wherein the processor coupled to the memory is further configured to be capable of executing the stored programmed instructions to:

detect one or more emotional transitions of the user based on one or more changes in the emotional index over a pre-defined time interval; and modify the one or more content recommendations based on the one or more emotional transitions.

3. The content recommendation device, as claimed in claim 2, wherein the processor coupled to the memory is further configured to be capable of executing the stored programmed instructions to:

determine an interest level of the user in the object of interest based on the emotional index, one or more gaze parameters, or one or more emotional transitions; and modify the one or more content recommendations based on the interest level of the user.

4. The content recommendation device as claimed in claim 1, wherein the processor coupled to the memory is further configured to be capable of executing the stored programmed instructions to:

determine at least one image parameter associated with the at least one image; and enhance the at least one image comprising modifying the at least one image parameter associated with the at least one image.

5. A method for recommending content implemented by one or more content recommendations devices, the method comprising:

receiving at least one image of a user;

analyzing the at least one image to determine one or more facial attributes of the user and one or more gaze parameters of the user;

determining, based on the gaze parameters, an object of interest of the user;

retrieving one or more characteristics of the object of interest;

determining, based on the one or more facial attributes, an emotional index associated with the user;

generating one or more content recommendations for the user based at least in part on the emotional index and the one or more characteristics of the object of interest;

determining an action in which the object of interest is involved;

classifying the determined action into one or more genres;

detecting an emotional transition of the user upon the user consuming the determined action;

comparing the emotional transition of the user upon the user consuming first content involving the object of interest, second content involving the object of interest involved in one or more actions associated with the one or more genres, and third content involving one or more actions associated with the one or more genres and not including the object of interest; and modifying the one or more content recommendations based on the comparison.

6. The method as claimed in claim 5, further comprising:

detecting one or more emotional transitions of the user based on one or more changes in the emotional index over a pre-defined time interval; and modifying the one or more content recommendations based on the one or more emotional transitions.

7. The method as claimed in claim 6, further comprising:

determining an interest level of the user in the object of interest based on the emotional index, one or more gaze parameters, or one or more emotional transitions; and modifying the one or more content recommendations based on the interest level of the user.

8. The method as claimed in claim 5, further comprising:

determining at least one image parameter associated with the at least one image; and enhancing the at least one image comprising modifying the at least one image parameter associated with the at least one image.

9. A non-transitory computer readable medium having stored thereon instructions for recommending content comprising executable code which when executed by a processor, causes the processor to:

receive at least one image of a user;

analyze the at least one image to determine one or more facial attributes of the user and one or more gaze parameters of the user;

determine, based on the gaze parameters, an object of interest of the user;
one or more characteristics of the object of interest;
determine, based on the one or more facial attributes, an emotional index associated with the user;
generate one or more content recommendations for the user based at least in part on the emotional index and the one or more characteristics of the object of interest;
determine an action in which the object of interest is involved;
classify the determined action into one or more genres;
detect an emotional transition of the user upon the user consuming the determined action;
compare the emotional transition of the user upon the user consuming first content involving the object of interest, second content involving the object of interest involved in one or more actions associated with the one or more genres, and third content involving one or more actions associated with the one or more genres and not including the object of interest; and
modify the one or more content recommendations based on the comparison.

10. The non-transitory computer readable medium as claimed in claim 9, wherein the executable code when executed by the processor further causes the processor to:
detect one or more emotional transitions of the user based on one or more changes in the emotional index over a pre-defined time interval; and
modify the one or more content recommendations based on the one or more emotional transitions.

11. The non-transitory computer readable medium as claimed in claim 10, wherein the executable code when executed by the processor further causes the processor to:
determining determine an interest level of the user in the object of interest based on the emotional index, one or more gaze parameters, or one or more emotional transitions; and
modify the one or more content recommendations based on the interest level of the user.

12. The non-transitory computer readable medium as claimed in claim 9, wherein the executable instructions, which, when executed by the processor, further cause the processor to:
determine at least one image parameter associated with the at least one image; and
enhance the at least one image comprising modifying the at least one image parameter associated with the at least one image.

* * * * *